United States Patent
Teng

(10) Patent No.: US 9,699,113 B2
(45) Date of Patent: Jul. 4, 2017

(54) METHOD AND APPARATUS FOR BANDWIDTH ADJUSTMENT IN NETWORK VIRTUALIZATION SYSTEM

(71) Applicant: Huawei Technologies Co., Ltd., Shenzhen, Guangdong (CN)

(72) Inventor: Xindong Teng, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 265 days.

(21) Appl. No.: 14/583,469

(22) Filed: Dec. 26, 2014

(65) Prior Publication Data

US 2015/0109922 A1    Apr. 23, 2015

Related U.S. Application Data

(63) Continuation of application No. PCT/CN2013/072476, filed on Mar. 12, 2013.

(30) Foreign Application Priority Data

Jun. 29, 2012  (CN) .......................... 2012 1 0220114

(51) Int. Cl.
| | |
|---|---|
| H04L 12/927 | (2013.01) |
| H04L 12/801 | (2013.01) |
| H04L 12/891 | (2013.01) |
| H04L 12/835 | (2013.01) |
| H04L 12/803 | (2013.01) |
| H04L 12/721 | (2013.01) |

(52) U.S. Cl.
CPC ............ *H04L 47/805* (2013.01); *H04L 47/12* (2013.01); *H04L 47/125* (2013.01); *H04L 47/30* (2013.01); *H04L 47/41* (2013.01); *H04L 45/68* (2013.01)

(58) Field of Classification Search
CPC .......... H04L 47/41; H04L 47/30; H04L 45/68
See application file for complete search history.

(56) References Cited

U.S. PATENT DOCUMENTS

| | | | |
|---|---|---|---|
| 2008/0253381 A1 | 10/2008 | Ward et al. | |
| 2012/0076145 A1 | 3/2012 | Kini | |

FOREIGN PATENT DOCUMENTS

| | | | |
|---|---|---|---|
| CN | 101425879 A | 5/2009 | |
| CN | 101478486 A | 7/2009 | |
| CN | 102263686 A | 11/2011 | |
| WO | WO 01/26309 A1 | 4/2001 | |
| WO | WO 2008/009235 A1 | 1/2008 | |

*Primary Examiner* — Michael Thier
*Assistant Examiner* — Kent Krueger
(74) *Attorney, Agent, or Firm* — Oblon, McClelland, Maier & Neustadt, L.L.P.

(57) ABSTRACT

A method and apparatus for bandwidth adjustment in a network virtualization system is described herein. The network virtualization system includes a central module and m remote modules, where the m remote modules are connected to a physical interface of the central module by n PWs. The method includes: acquiring, from the m remote modules, a real-time bandwidth of each PW of the n PWs; when a sum of the acquired real-time bandwidths of the n PWs is greater than a bandwidth of the physical interface, adjusting configured bandwidths of P PWs; and separately sending values of adjusted configured bandwidths of the P PWs to the remote modules separately connected to the P PWs.

12 Claims, 6 Drawing Sheets

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|1|0|  Message type    | Message length  |   PW quantity        |
+-+-+-+-+-+-+-+-+-+-+-+-+-+-+-+-+-+-+-+-+-+-+-+-+-+-+-+-+-+-+-+-+
|                      Pseudo Wire PW1 ID                       |
+-+-+-+-+-+-+-+-+-+-+-+-+-+-+-+-+-+-+-+-+-+-+-+-+-+-+-+-+-+-+-+-+
|         Queue length usage corresponding to Pseudo Wire PW1   |
+-+-+-+-+-+-+-+-+-+-+-+-+-+-+-+-+-+-+-+-+-+-+-+-+-+-+-+-+-+-+-+-+
|                      Pseudo Wire PW2 ID                       |
+-+-+-+-+-+-+-+-+-+-+-+-+-+-+-+-+-+-+-+-+-+-+-+-+-+-+-+-+-+-+-+-+
|         Queue length usage corresponding to Pseudo Wire PW2   |
+-+-+-+-+-+-+-+-+-+-+-+-+-+-+-+-+-+-+-+-+-+-+-+-+-+-+-+-+-+-+-+-+
|                         ......                                |
+-+-+-+-+-+-+-+-+-+-+-+-+-+-+-+-+-+-+-+-+-+-+-+-+-+-+-+-+-+-+-+-+
|                      Pseudo Wire PWn ID                       |
+-+-+-+-+-+-+-+-+-+-+-+-+-+-+-+-+-+-+-+-+-+-+-+-+-+-+-+-+-+-+-+-+
|         Queue length usage corresponding to Pseudo Wire PWn   |
+-+-+-+-+-+-+-+-+-+-+-+-+-+-+-+-+-+-+-+-+-+-+-+-+-+-+-+-+-+-+-+-+
```

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|1|0|   Message type      | Message length |   PW quantity      |
+-+-+-+-+-+-+-+-+-+-+-+-+-+-+-+-+-+-+-+-+-+-+-+-+-+-+-+-+-+-+-+-+
|                    Pseudo Wire PW1 ID                          |
+-+-+-+-+-+-+-+-+-+-+-+-+-+-+-+-+-+-+-+-+-+-+-+-+-+-+-+-+-+-+-+-+
|              Real-time bandwidth of Pseudo Wire PW1            |
+-+-+-+-+-+-+-+-+-+-+-+-+-+-+-+-+-+-+-+-+-+-+-+-+-+-+-+-+-+-+-+-+
|                    Pseudo Wire PW2 ID                          |
+-+-+-+-+-+-+-+-+-+-+-+-+-+-+-+-+-+-+-+-+-+-+-+-+-+-+-+-+-+-+-+-+
|              Real-time bandwidth of Pseudo Wire PW2            |
+-+-+-+-+-+-+-+-+-+-+-+-+-+-+-+-+-+-+-+-+-+-+-+-+-+-+-+-+-+-+-+-+
|                         ......                                 |
+-+-+-+-+-+-+-+-+-+-+-+-+-+-+-+-+-+-+-+-+-+-+-+-+-+-+-+-+-+-+-+-+
|                    Pseudo Wire PWn ID                          |
+-+-+-+-+-+-+-+-+-+-+-+-+-+-+-+-+-+-+-+-+-+-+-+-+-+-+-+-+-+-+-+-+
|              Real-time bandwidth of Pseudo Wire PWn            |
+-+-+-+-+-+-+-+-+-+-+-+-+-+-+-+-+-+-+-+-+-+-+-+-+-+-+-+-+-+-+-+-+
```

FIG. 4

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|1|0|   Message type      | Message length  |   PW quantity     |
+-+-+-+-+-+-+-+-+-+-+-+-+-+-+-+-+-+-+-+-+-+-+-+-+-+-+-+-+-+-+-+-+
|                    Pseudo Wire PW1 ID                         |
+-+-+-+-+-+-+-+-+-+-+-+-+-+-+-+-+-+-+-+-+-+-+-+-+-+-+-+-+-+-+-+-+
|          Queue length usage corresponding to Pseudo Wire PW1  |
+-+-+-+-+-+-+-+-+-+-+-+-+-+-+-+-+-+-+-+-+-+-+-+-+-+-+-+-+-+-+-+-+
|                    Pseudo Wire PW2 ID                         |
+-+-+-+-+-+-+-+-+-+-+-+-+-+-+-+-+-+-+-+-+-+-+-+-+-+-+-+-+-+-+-+-+
|          Queue length usage corresponding to Pseudo Wire PW2  |
+-+-+-+-+-+-+-+-+-+-+-+-+-+-+-+-+-+-+-+-+-+-+-+-+-+-+-+-+-+-+-+-+
|                         ......                                |
+-+-+-+-+-+-+-+-+-+-+-+-+-+-+-+-+-+-+-+-+-+-+-+-+-+-+-+-+-+-+-+-+
|                    Pseudo Wire PWn ID                         |
+-+-+-+-+-+-+-+-+-+-+-+-+-+-+-+-+-+-+-+-+-+-+-+-+-+-+-+-+-+-+-+-+
|          Queue length usage corresponding to Pseudo Wire PWn  |
+-+-+-+-+-+-+-+-+-+-+-+-+-+-+-+-+-+-+-+-+-+-+-+-+-+-+-+-+-+-+-+-+
```

FIG. 5

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|1|0|   Message type    | Message length   |    PW quantity     |
+-+-+-+-+-+-+-+-+-+-+-+-+-+-+-+-+-+-+-+-+-+-+-+-+-+-+-+-+-+-+-+-+
|                    Pseudo Wire PW1 ID                          |
+-+-+-+-+-+-+-+-+-+-+-+-+-+-+-+-+-+-+-+-+-+-+-+-+-+-+-+-+-+-+-+-+
|         Adjusted configured bandwidth of Pseudo Wire PW1       |
+-+-+-+-+-+-+-+-+-+-+-+-+-+-+-+-+-+-+-+-+-+-+-+-+-+-+-+-+-+-+-+-+
|                    Pseudo Wire PW2 ID                          |
+-+-+-+-+-+-+-+-+-+-+-+-+-+-+-+-+-+-+-+-+-+-+-+-+-+-+-+-+-+-+-+-+
|         Adjusted configured bandwidth of Pseudo Wire PW2       |
+-+-+-+-+-+-+-+-+-+-+-+-+-+-+-+-+-+-+-+-+-+-+-+-+-+-+-+-+-+-+-+-+
|                          ......                                |
+-+-+-+-+-+-+-+-+-+-+-+-+-+-+-+-+-+-+-+-+-+-+-+-+-+-+-+-+-+-+-+-+
|                    Pseudo Wire PWn ID                          |
+-+-+-+-+-+-+-+-+-+-+-+-+-+-+-+-+-+-+-+-+-+-+-+-+-+-+-+-+-+-+-+-+
|         Adjusted configured bandwidth of Pseudo Wire PWn       |
+-+-+-+-+-+-+-+-+-+-+-+-+-+-+-+-+-+-+-+-+-+-+-+-+-+-+-+-+-+-+-+-+
```

FIG. 6

METHOD AND APPARATUS FOR BANDWIDTH ADJUSTMENT IN NETWORK VIRTUALIZATION SYSTEM

CROSS-REFERENCE TO RELATED APPLICATION

This application is a continuation of International Application No. PCT/CN2013/072476, filed on Mar. 12, 2013, which claims priority to Chinese Patent Application No. 201210220114.8, filed on Jun. 29, 2012, both of which are hereby incorporated by reference in their entireties.

TECHNICAL FIELD

Embodiments of the present application relate to the field of communications technologies, and in particular, to a method and an apparatus for bandwidth adjustment in a network virtualization system.

BACKGROUND

A quality of service (Quality of Service, QoS for short) technology is a technology used by a network device to ensure quality of forwarded user data, and it mainly performs measurement by using metrics such as a bandwidth, delay, and packet loss rate. For an Internet Protocol (Internet Protocol, IP for short) network, because a packet is processed in a best-effort forwarding manner, some types of services (such as video and voice) may not be forwarded in a timely manner and consequently service quality cannot meet a requirement if no QoS mechanism is provided. Therefore, a QoS capability of a network device is a very important measurement standard. The network device mainly uses a queue and scheduling mechanism to support the QoS. A queue is a basic unit of scheduling and indicates a property or type (for example, a source port or destination port corresponding to a packet, a priority of the packet, and the like) of a current packet. The scheduling mechanism uses different algorithms (for example, a priority-based algorithm and a weight-based algorithm) to make a determination, so that the current packet in a queue is forwarded and processed.

To solve problems of excessive network nodes, complicated networking, and management difficulties, a network virtualization solution is introduced into the industry. A network virtualization device is formed by a central module and a remote module. A broadband remote access server (Broadband Remote Access Server, BRAS for short) or a service router (Service Router, SR for short) on a network is virtualized as a central module and is mainly responsible for control processing and service forwarding processing. An optical line terminal (Optical Line Terminal, OLT for short) on the network is virtualized as a remote module, and is mainly controlled by the central module, accesses user data through a remote port, and sends the user data to the central module for forwarding. A basic technology for network virtualization includes horizontal virtualization and vertical virtualization. In horizontal virtualization, two or more central modules are clustered as one device; a unified management plane is used to perform management; a unified control plane is used to process a routing protocol and establish a forwarding entry; and a received data packet is forwarded by locally searching a table. In vertical virtualization, a remote module and a central module are combined as two parts of a virtual device by using an internal interconnection channel; the remote module is managed and controlled by the central module; logically, the remote module and the central module are not two devices any longer; a data packet is sent, according to a local forwarding table of the remote module, to the central module for forwarding; and the internal interconnection channel is mainly implemented by establishing an internal pseudo wire (Pseudo wire, PW for short) based on IP and Multi-Protocol Label Switching (Multi-Protocol Label Switching, MPLS for short). At present, the QoS in the network virtualization solution cannot be implemented by using a perfect solution, and is still implemented by using a same method as that in a non-virtualization scenario. That is, the central module and the remote module separately perform QoS processing without cooperating well with each other. When forwarding traffic to the central module, the remote module does not consider an actual processing capability of the central module, resulting in frequent network congestion on the central module. For example, when a plurality of remote modules is connected to a physical interface of the central module by PWs, because bandwidth configuration for the PW of each remote module is separately performed, a sum of configured bandwidths of the PWs connected to the same physical interface of the central module is often greater than a bandwidth of the physical interface of the central module. When the sum of the configured bandwidths of the PWs connected to the same physical interface of the central module is greater than the bandwidth of the physical interface, a real-time bandwidth of the traffic sent by a plurality of remote modules to the central module through the PWs may be caused to exceed the bandwidth of the physical interface, resulting in problems of network congestion, packet losses, and the like.

SUMMARY

Embodiments of the present application provide a method and an apparatus for bandwidth adjustment in a network virtualization system, to solve a traffic loss problem that arises when a sum of real-time traffic sent by remote modules to a central module through PWs in network virtualization exceeds a processing capability of the central module.

According to one aspect of an embodiment of the present application, a method for bandwidth adjustment in a network virtualization system is provided, where the network virtualization system includes a central module and m remote modules, the m remote modules are connected to a physical interface of the central module by n PWs, traffic is transmitted over the n PWs, and m and n are positive integers. The method includes:

acquiring, from the m remote modules, a real-time bandwidth of each PW of the n PWs, where the real-time bandwidth is a value of a bandwidth occupied by real-time traffic transmitted through each PW from a remote module to the central module;

when a sum of the acquired real-time bandwidths of the n PWs is greater than a bandwidth of the physical interface, adjusting configured bandwidths of P (P<=n) PWs, so that the sum of the real-time bandwidths of the n PWs is not greater than the bandwidth of the physical interface, where P is a positive integer, and the P PWs are PWs of the n PWs; and separately sending values of adjusted configured bandwidths of the P PWs to the remote modules separately connected to the PPWs.

According to another aspect of the embodiment of the present application, an apparatus for bandwidth adjustment in a network virtualization system is provided, where the network virtualization system includes the apparatus for bandwidth adjustment and m remote modules, them remote modules are connected to a physical interface of the apparatus for bandwidth adjustment by n PWs, traffic is transmitted over the n PWs, and m and n are positive integers. The apparatus for bandwidth adjustment includes:

a first acquiring unit, configured to acquire, from the m remote modules, a real-time bandwidth of each PW of then PWs, where the real-time bandwidth is a value of a bandwidth occupied by real-time traffic transmitted through each PW from a remote module to the central module;

a first bandwidth adjustment unit, configured to adjust configured bandwidths of P (P<=n) PWs when a sum of the acquired real-time bandwidths of the n PWs is greater than the bandwidth of the physical interface, so that the sum of the real-time bandwidths of the n PWs is not greater than the bandwidth of the physical interface, where P is a positive integer, and the P PWs are PWs of the n PWs; and a bandwidth sending unit, configured to separately send values of adjusted configured bandwidths of the P PWs to the remote modules separately connected to the P PWs.

To sum up, by using technical solutions provided in the embodiments of the present application, when the central module in the network virtualization system acquires the real-time bandwidths of the PWs connecting the remote modules to the central module and determines that the sum of the real-time bandwidths of the PWs is greater than the bandwidth of the physical interface of the central module, the configured bandwidths of the PWs of the remote modules are adjusted. Buffer capabilities of the remote modules are fully used to avoid problems of network congestion and packet losses that occur on the central module.

BRIEF DESCRIPTION OF THE DRAWINGS

To describe the technical solutions in the embodiments of the present application more clearly, the following briefly introduces the accompanying drawings required for describing the embodiments. Apparently, the accompanying drawings in the following description show some embodiments of the present application, and persons of ordinary skill in the art may still derive other drawings from these accompanying drawings without creative efforts.

FIG. 4 is a schematic diagram of a message format of a bandwidth response message according to an embodiment of the present application;

FIG. 5 is a schematic diagram of a message format of a queue response message according to an embodiment of the present application;

FIG. 6 is a schematic diagram of a message format of a notification message according to an embodiment of the present application;

DETAILED DESCRIPTION

To make the objectives, technical solutions, and advantages of the embodiments of the present application clearer, the following clearly describes the technical solutions in the embodiments of the present application with reference to the accompanying drawings in the embodiments of the present application. Apparently, the described embodiments are a part rather than all of the embodiments of the present application. All other embodiments acquired by persons of ordinary skill in the art based on the embodiments of the present application without creative efforts shall fall within the protection scope of the present application.

Figure 1:
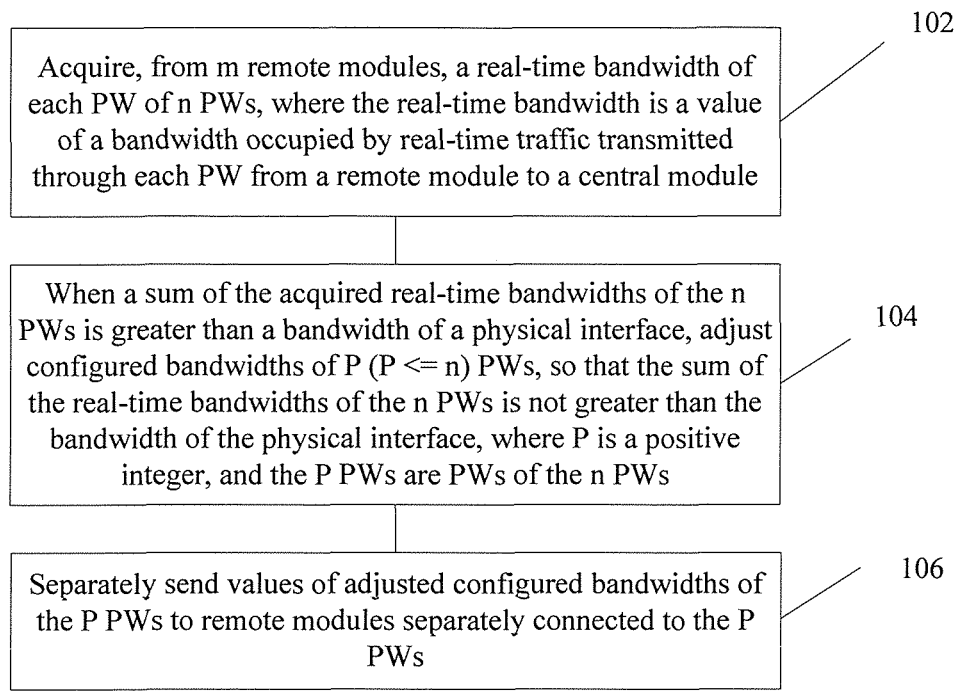
FIG. 1 is a schematic diagram of a method for bandwidth adjustment in a network virtualization system according to an embodiment of the present application.
Figure 2:
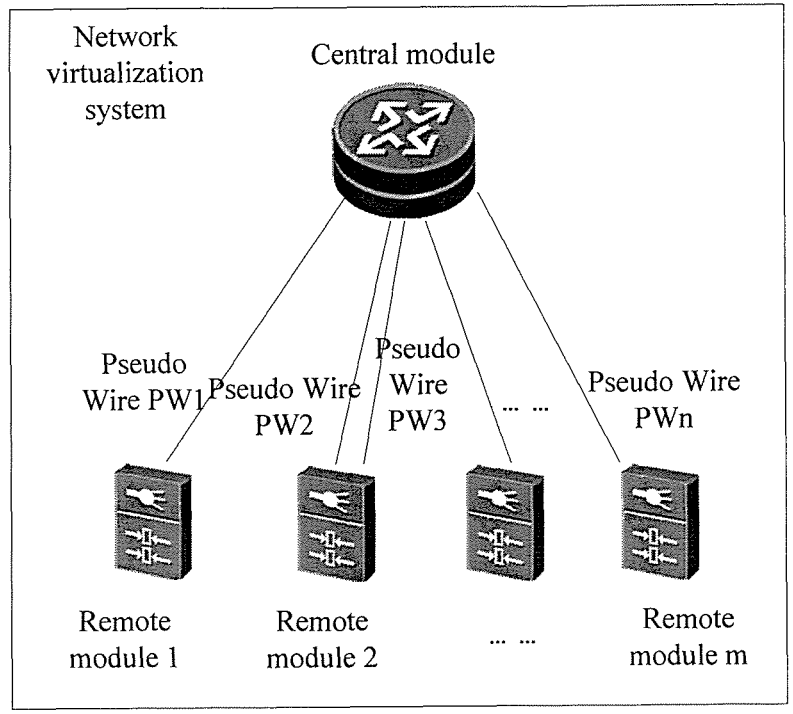
FIG. 2 is a schematic diagram of a network virtualization system according to an embodiment of the present application.

Referring to FIG. 1, an embodiment of the present application provides a method for bandwidth adjustment in a network virtualization system, where the network virtualization system includes a central module and m remote modules, the m remote modules are connected to a physical interface of the central module by n PWs, traffic is transmitted through the n PWs, and m and n are positive integers. The method includes the following content:

102: Acquire, from the m remote modules, a real-time bandwidth of each PW of the n PWs, where the real-time bandwidth is a value of a bandwidth occupied by real-time traffic transmitted through each PW from a remote module to the central module.

Optionally, the acquiring, from the m remote modules, a real-time bandwidth of each PW of the n PWs, specifically includes: separately acquiring the real-time bandwidth of each PW of the n PWs according to a manner of acquiring a real-time bandwidth of a $Q^{th}$ (Q<=n) PW, where Q is a positive integer, the $Q^{th}$ PW is any one of the n PWs, and the acquiring a real-time bandwidth of a $Q^{th}$ PW includes:

sending a $Q^{th}$ bandwidth request message to a remote module corresponding to the $Q^{th}$ PW, where the $Q^{th}$ bandwidth request message includes an identifier ID of the $Q^{th}$ PW; and receiving a $Q^{th}$ bandwidth response message, where the $Q^{th}$ bandwidth response message includes the real-time bandwidth of the $Q^{th}$ PW and the $Q^{th}$ bandwidth response message is a response message corresponding to the $Q^{th}$ bandwidth request message.

The remote module corresponding to the $Q^{th}$ PW is a remote module connected to the central module by the $Q^{th}$ PW. The $Q^{th}$ bandwidth response message may be implemented by using a Label Distribution Protocol (Label Distribution Protocol, LDP for short) message, and specifically, by using an optional parameters (Optional parameters) part of an extended LDP message. The optional parameters part of the LDP message may use a message format shown in FIG. 3. Meanings of fields are as follows:

Message type: It is used to indicate that the $Q^{th}$ bandwidth request message is used to acquire the real-time bandwidth of the PW. A value of the message type may be customized as a specific value different from other message types, for example, the value of the message type is 101, and the message type occupies 14 bits.

Message length: It is used to indicate a length of a data content part in the $Q^{th}$ bandwidth request message, and the message length occupies eight bits.

PW quantity: It is used to indicate a quantity of PWs whose real-time bandwidths are to be acquired by using the $Q^{th}$ bandwidth request message. When the $Q^{th}$ bandwidth request message is used to acquire real-time bandwidths of a plurality of PWs, the PW quantity field is used to indicate a quantity of the plurality of PWs.

PW1 ID: It is used to indicate an ID of a first PW included in the $Q^{th}$ bandwidth request message.

A format of a bandwidth request message sent for acquiring a real-time bandwidth of another PW of the n PWs is the same as that of the $Q^{th}$ bandwidth request message, the only difference lies in that the ID field of the $Q^{th}$ PW is filled in with an ID of the PW for which the real-time bandwidth needs to be acquired.

Figure 3:
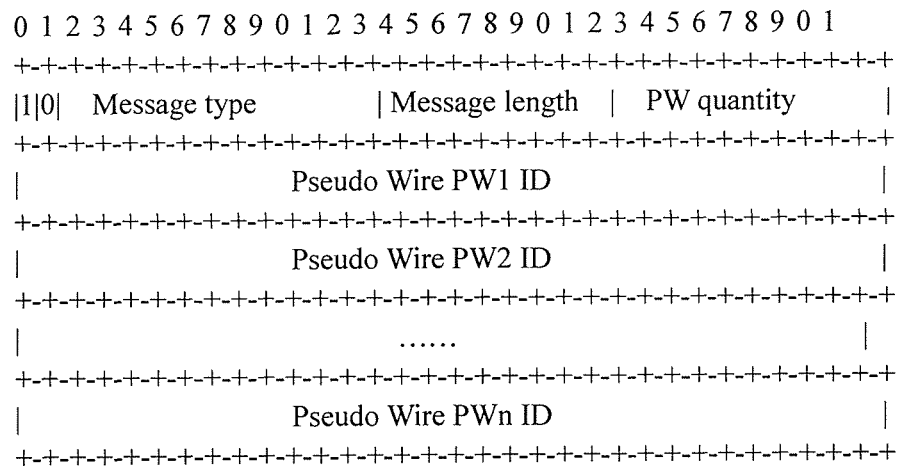
FIG. 3 is a schematic diagram of a message format of a bandwidth or queue request message according to an embodiment of the present application.

Optionally, when a remote module is connected to the central module by a plurality of PWs, if real-time bandwidths of the plurality of PWs need to be acquired, a bandwidth request message may be sent to the remote module, and the bandwidth request message needs to include an ID of each PW of the plurality of PWs. Using the $Q^{th}$ bandwidth request message as an example, the message format of the $Q^{th}$ bandwidth request message as shown in FIG. 3 further includes:

PW2 ID: It is used to indicate an ID of a second PW included in the $Q^{th}$ bandwidth request message.

PWn ID: It is used to indicate an ID of an $n^{th}$ PW included in the $Q^{th}$ bandwidth request message.

After the remote module corresponding to the $Q^{th}$ PW receives the $Q^{th}$ bandwidth request message and acquires the message type of the $Q^{th}$ bandwidth request message by parsing, when it is determined that the message type is a specific value, for example, the specific value is 101, the remote module collects statistics on the real-time bandwidth of the $Q^{th}$ PW and sends a $Q^{th}$ bandwidth response message to the central module, where the $Q^{th}$ bandwidth response message includes the real-time bandwidth of the $Q^{th}$ PW acquired by statistics collection. After receiving the $Q^{th}$ bandwidth response message, the central module acquires the real-time bandwidth of the $Q^{th}$ PW by parsing. The $Q^{th}$ bandwidth response message may be implemented by using an extended LDP message, and specifically, by using an optional parameters part of the extended LDP message. The optional parameters part of the extended LDP message may use a message format shown in FIG. 4. Meanings of fields are as follows:

Message type: It is used to indicate that the $Q^{th}$ bandwidth response message is used to carry the real-time bandwidth of the PW. A value of the message type may be customized as a specific value different from other message types, for example, the value of the message type is 102, and the message type occupies 14 bits.

Message length: It is used to indicate a length of a data content part in the $Q^{th}$ bandwidth response message, and the message length occupies eight bits.

PW quantity: It is used to indicate a quantity of PWs whose real-time bandwidths are included in the $Q^{th}$ bandwidth response message. When the $Q^{th}$ bandwidth response message is used to include real-time bandwidths of a plurality of PWs, the PW quantity field is used to indicate a quantity of the plurality of PWs.

PW1 ID: It is used to indicate an ID of a first PW included in the $Q^{th}$ bandwidth response message.

Real-time bandwidth of PW1: It is used to indicate the real-time bandwidth of the $Q^{th}$ PW included in the $Q^{th}$ bandwidth response message.

Optionally, when a remote module is connected to the central module by a plurality of PWs and the $Q^{th}$ bandwidth request message includes IDs of the plurality of PWs, the remote module may send a bandwidth response message to the central module, and the bandwidth response message needs to include the real-time bandwidth of each PW of the plurality of PWs. Using the $Q^{th}$ bandwidth response message as an example, the message format of the $Q^{th}$ bandwidth response message as shown in FIG. 4, further includes:

PW2 ID: It is used to indicate an ID of a second PW included in the $Q^{th}$ bandwidth response message.

Real-time bandwidth of PW2: It is used to indicate a real-time bandwidth of the second PW included in the $Q^{th}$ bandwidth response message.

PWn ID: It is used to indicate an ID of an $n^{th}$ PW included in the $Q^{th}$ bandwidth response message.

Real-time bandwidth of PWn: It is used to indicate a real-time bandwidth of the $n^{th}$ PW included in the $Q^{th}$ bandwidth response message.

A format of a bandwidth response message received when a real-time bandwidth of another PW of the n PWs is acquired, is the same as that of the $Q^{th}$ bandwidth response message. The only difference lies in that the ID field of the $Q^{th}$ PW is filled in with an ID of the PW whose real-time bandwidth is acquired, and that the real-time bandwidth field of the $Q^{th}$ PW is filled in with the corresponding acquired real-time bandwidth of the PW.

After the central module receives the $Q^{th}$ bandwidth response message, and acquires the message type of the $Q^{th}$ bandwidth response by parsing, when it is determined that the message type is a specific value, for example, the specific value is 102, the central module acquires the real-time bandwidth of the $Q^{th}$ PW by parsing.

104: When a sum of the acquired real-time bandwidths of the n PWs is greater than a bandwidth of the physical interface, adjust configured bandwidths of P (P<=n) PWs, so that the sum of the real-time bandwidths of the n PWs is not greater than the bandwidth of the physical interface, where P is a positive integer, and the P PWs are PWs of the n PWs.

106: Separately send values of adjusted configured bandwidths of the P PWs to remote modules separately connected to the P PWs.

Optionally, the adjusting configured bandwidths of the n PWs, so that the sum of the real-time bandwidths of the n PWs is not greater than the bandwidth of the physical interface, includes:
  acquiring, from the m remote modules, queue length usage of a packet queue corresponding to each PW of the n PWs, where the queue length usage is a ratio of a queue length of unsent packets in the packet queue to a total queue length;
  acquiring a bandwidth usage equalization rate of each PW, where the bandwidth usage equalization rate of the PW is acquired by dividing queue length usage of the packet queue corresponding to the PW by the real-time bandwidth of the PW; and
  adjusting the configured bandwidths of the P PWs according to the bandwidth usage equalization rate of each PW of the n PWs, so that the sum of the real-time bandwidths of the n PWs is not greater than the bandwidth of the physical interface.

Optionally, the acquiring queue length usage of a packet queue corresponding to each PW of the n PWs specifically includes: separately acquiring the queue length usage of the packet queue corresponding to each PW of the n PWs according to a manner of acquiring queue length usage of a packet queue corresponding to an $R^{th}$ (R<=n) PW, where R is a positive integer, the $R^{th}$ PW is any PW of the n PWs, and the acquiring queue length usage of a packet queue corresponding to an $R^{th}$ PW includes:

sending an $R^{th}$ queue request message to a remote module corresponding to the $R^{th}$ PW, where the $R^{th}$ queue request message includes an ID of the $R^{th}$ PW; and receiving an $R^{th}$ queue response message sent by the remote module corresponding to the $R^{th}$ PW, where the $R^{th}$ queue response message includes the queue length usage of the packet queue corresponding to the $R^{th}$ PW, and the $R^{th}$ queue response message is a response message corresponding to the $R^{th}$ queue request message.

Optionally, the $R^{th}$ queue request message may be implemented by using an extended LDP message, and specifically, by using an optional parameters part of the extended LDP message. The optional parameters part of the extended LDP message may use a message format shown in FIG. 3. Meanings of fields are as follows:

Message type: It is used to indicate that the $R^{th}$ queue request message is used to acquire the queue length usage of the PW. A value of the message type may be customized as a specific value different from other message types, for example, the value of the message type is 103, and the message type occupies 14 bits.

Message length: It is used to indicate a length of a data content part in the $R^{th}$ queue request message, and the message length occupies eight bits.

PW quantity: It is used to indicate a quantity of PWs whose queue length usage of packet queues is to be acquired by using the $R^{th}$ queue request message.

PW1 ID: It is used to indicate an ID of a first PW included in the $R^{th}$ queue request message.

Optionally, when a remote module is connected to the central module by a plurality of PWs, if queue length usage of packet queues corresponding to the plurality of PWs needs to be acquired, a queue request message may be sent to the remote module, and the queue request message needs to include an ID of each PW of the plurality of PWs. Using the $R^{th}$ queue request message as an example, the message format of the $R^{th}$ bandwidth request message as shown in FIG. 3, further includes:

PW2 ID: It is used to indicate an ID of a second PW included in the $R^{th}$ queue request message.

PWn ID: It is used to indicate an ID of an $n^{th}$ PW included in the $R^{th}$ queue request message.

After the remote module corresponding to the $R^{th}$ PW receives the $R^{th}$ queue request message, and acquires the message type of the $R^{th}$ queue request message by parsing, when it is determined that the message type is a specific value, for example, the specific value is 103, the remote module collects statistics on the queue length usage of the packet queue corresponding to the $R^{th}$ PW and sends an $R^{th}$ queue response message to the central module, where the $R^{th}$ bandwidth response message includes the real-time bandwidth of the $R^{th}$ PW acquired by statistics collection. After receiving the $R^{th}$ queue response message, the central module acquires the queue length usage of the packet queue corresponding to the $R^{th}$ PW by parsing. The $R^{th}$ queue response message may be implemented by using an extended LDP message, and specifically, by using an optional parameters part of the extended LDP message. The optional parameters part of the extended LDP message may use a message format shown in FIG. 5. Meanings of fields are as follows:

Message type: It is used to indicate that the $R^{th}$ queue response message is used to carry the queue length usage of the queue corresponding to the PW. A value of the message type may be customized as a specific value different from other message types, for example, the value of the message type is 104, and the message type occupies 14 bits.

Message length: It is used to indicate a length of a data content part in the $R^{th}$ queue response message, and the message length occupies eight bits.

PW quantity: It is used to indicate a quantity of PWs whose queue length usage of packet queues is included in the $R^{th}$ queue response message.

PW1 ID: It is used to indicate an ID of a first PW included in the $R^{th}$ queue response message.

Queue length usage corresponding to PW1: It is used to indicate the queue length usage of the packet queue corresponding to the $R^{th}$ PW included in the $R^{th}$ queue response message.

Optionally, when a remote module is connected to the central module by a plurality of PWs and the $R^{th}$ queue request message includes IDs of the plurality of PWs, the remote module may send a queue response message to the central module, and the queue response message needs to include queue length usage of packet queues corresponding to the plurality of PWs. Using the $R^{th}$ queue response message as an example, the message format of the $R^{th}$ queue response message as shown in FIG. 5, further includes:

PW2 ID: It is used to indicate an ID of a second PW included in the $R^{th}$ queue response message.

Queue length usage corresponding to PW2: It is used to indicate queue length usage of a packet queue corresponding to the second PW included in the $R^{th}$ queue response message.

PWn ID: It is used to indicate an ID of an $n^{th}$ PW included in the $R^{th}$ queue response message.

Queue length usage corresponding to PWn: It is used to indicate queue length usage of a packet queue corresponding to the $n^{th}$ PW included in the $R^{th}$ queue response message.

The packet queue corresponding to the $R^{th}$ PW is a packet queue, of sent packet queues saved by the remote module corresponding to the $R^{th}$ PW, PW sent to the central module through the $R^{th}$ PW. After the remote module corresponding to the $R^{th}$ PW receives the $R^{th}$ queue request message, and acquires the message type of the $R^{th}$ queue request message by parsing, when it is determined that the message type is a specific value, for example, the specific value is 104, the remote module collects statistics on the queue length usage of the packet queue corresponding to the $R^{th}$ PW and sends an $R^{th}$ queue response message to the central module, where the $R^{th}$ queue response message includes the queue length usage corresponding to the $R^{th}$ PW, which is acquired by statistics collection. After receiving the $R^{th}$ queue response message, the central module acquires the queue length usage of the packet queue corresponding to the $R^{th}$ PW by parsing.

The acquired bandwidth usage equalization rate of each PW is used to indicate a bandwidth usage condition of each PW, where the bandwidth usage equalization rate of the PW is acquired by dividing queue length usage of the packet queue corresponding to the PW by the real-time bandwidth of the PW. When queue length usage of a packet queue corresponding to a PW is lower and a real-time bandwidth of the PW is larger, the bandwidth usage equalization rate of the PW is lower.

Optionally, the sending the adjusted configured bandwidths of the PWs, whose configured bandwidths are adjusted, of the n PWs to the corresponding remote ends may be implemented by sending a notification message to the remote modules corresponding to the PWs whose configured bandwidths are adjusted, where the notification message may be implemented by using an extended LDP message, and specifically, by using an optional parameters part of the extended LDP message. The optional parameters part of the extended LDP message may use a message format shown in FIG. 6. Meanings of fields are as follows:

Message type: It is used to indicate that the notification message carries the adjusted configured bandwidths of the PWs. A value of the message type may be customized as a specific value different from other message types, for example, the value of the message type is 105, and the message type occupies 14 bits.

Message length: It is used to indicate a length of a data content part in the notification message, and the message length occupies eight bits.

PW quantity: It is used to indicate a quantity of PWs whose adjusted configured bandwidths are included in the notification message.

PW1 ID: It is used to indicate an ID of a first PW included in the notification message.

Adjusted configured bandwidth of PW1: It is used to indicate an adjusted configured bandwidth corresponding to the first PW included in the notification message.

Optionally, when configured bandwidths of a plurality of PWs of a remote module are adjusted, the central module may send a notification message to the remote module, where the notification message includes adjusted configured bandwidths of the plurality of PWs, and the message format of the notification message may further include:

PW2 ID: It is used to indicate an ID of a second PW included in the notification message.

Adjusted configured bandwidth of PW2: It is used to indicate an adjusted configured bandwidth of the second PW included in the notification message.

PWn ID: It is used to indicate an ID of an $n^{th}$ PW included in the notification message.

Adjusted configured bandwidth of PWn: It is used to indicate an adjusted configured bandwidth of the $n^{th}$ PW included in the notification message.

Figure 7:
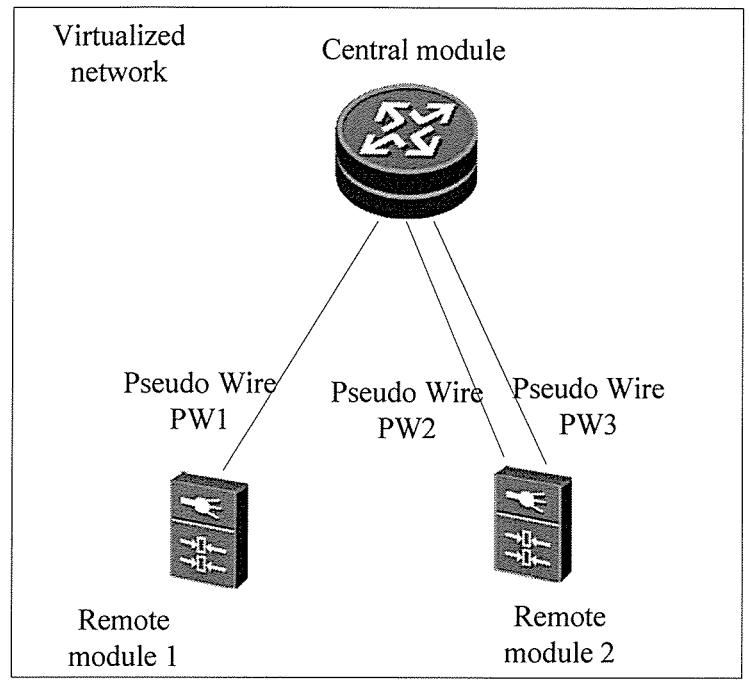
FIG. 7 is a schematic diagram of an example of a network virtualization system for bandwidth adjustment according to an embodiment of the present application.

To illustrate the foregoing technical solution more clearly, the following describes an example, as shown in FIG. 7:

A network virtualization system includes a central module 1, a remote module 1, and a remote module 2. The remote module 1 is connected to the central module by a PW1, and the remote module 2 is connected to the central module 1 by a PW2 and a PW3. The PW1, PW2, and PW3 are connected to a physical interface 1 of the central module 1. A bandwidth of the physical interface 1 is 10 Gbit/s, a configured bandwidth of the PW1 is 3 Gbit/s, a configured bandwidth of the PW2 is 6 Gbit/s, and a configured bandwidth of the PW3 is 8 Gbit/s. The central module 1 sends a first bandwidth request message to the remote module 1, and the first bandwidth request message is used to acquire a real-time bandwidth of the PW1. The central module 1 sends a second bandwidth request message to the remote module 2, and the second bandwidth request message is used to acquire real-time bandwidths of the PW2 and PW3. It is assumed that: the real-time bandwidth sent by the remote module 1 to the central module 1 through the PW1 is 3 Gbit/s, the real-time bandwidth sent by the remote module 2 to the central module 1 through the PW2 is 5 Gbit/s, and the real-time bandwidth sent by the remote module 2 to the central module 1 through the PW3 is 7 Gbit/s. After acquiring the real-time bandwidths of the PW1, PW2, and PW3, the central module 1 determines that a sum of the real-time bandwidths of the PW1, PW2, and PW3 is greater than a bandwidth of the physical interface 1 (an excessive bandwidth value is 5 Gbit/s, and the 5 Gbit/s excessive traffic cannot be normally received by the physical interface 1 and will be discarded), sends the first queue request message to the remote module 1, where the first queue request message is used to acquire queue length usage of a packet queue corresponding to the PW1 on the remote module 1, and sends the second queue request message to the remote module 2, where the second queue request message is used to acquire queue length usage of packet queues corresponding to the PW2 and PW3 on the remote module 2. It is assumed that: the queue length usage of the packet queue corresponding to the PW1 on the remote module 1 is 50%, the queue length usage of the packet queue corresponding to the PW2 on the remote module 2 is 30%, and the queue length usage of the packet queue corresponding to the PW3 is 20%. After the central module 1 acquires the queue length usage of the packet queues corresponding to the PW1, PW2, and PW3, further, the central module 1 calculates and acquires a bandwidth usage equalization rate of each PW according to the acquired real-time bandwidth of each PW and the queue length usage corresponding to each PW.

A bandwidth usage equalization rate of the PW1 is: 50%/3=16.7%;
  a bandwidth usage equalization rate of the PW2 is: 30%/5=6%; and
  a bandwidth usage equalization rate of the PW3 is: 20%/7=2.9%.

After acquiring the bandwidth usage equalization rate of each PW, the central module 1 adjusts the bandwidth of the PW according to the bandwidth usage equalization rate of each PW, so that a sum of real-time bandwidths of the PW1, PW2, and PW3 after the configured bandwidths are adjusted are not greater than the bandwidth of the physical interface 1.

Specifically, a manner of adjusting the bandwidths of the PW1, PW2, and PW3 may be any one of the following:

A first manner: The bandwidths are adjusted according to a ratio of the bandwidth usage equalization rates of the PW1, PW2, and PW3.

The ratio of the bandwidth usage equalization rates of the PW1, PW2, and PW3 is 16.7%:6%:2.9%, and is approximately 6:2:1. The bandwidths are adjusted according to an inverse ratio of this ratio. Reduced values of the real-time bandwidths of the PW1, PW2, and PW3 are determined according to 1:2:6.

The reduced value of the real-time bandwidth of the PW1 is 5*1/9=5/9 Gbit/s, and is approximately 0.5 Gbit/s;
  the reduced value of the real-time bandwidth of the PW2 is 5*2/9=10/9 Gbit/s, and is approximately 1 Gbit/s; and
  the reduced value of the real-time bandwidth of the PW3 is 5*6/9=30/9 Gbit/s, and is approximately 3.5 Gbit/s.

After being reduced, configured bandwidths of the PW1, PW2, and PW3 may be calculated according to the reduced values of the real-time bandwidths of the PW1, PW2, and PW3:

After being reduced, the configured bandwidth of the PW1 is: 3−0.5=2.5 Gbit/s;
  after being reduced, the configured bandwidth of the PW2 is: 5−1=4 Gbit/s; and
  after being reduced, the configured bandwidth of the PW3 is: 7−3.5=3.5 Gbit/s.

A second manner: A configured bandwidth only of a PW with a lowest bandwidth usage equalization rate may be adjusted.

For the PW3, compared with the PW1 and PW2, the bandwidth usage equalization rate of the PW3 is the lowest. This indicates that the packet queue corresponding to the PW3 on the remote module 2 still has a sufficient buffering capability. The bandwidth occupied by the PW3 may be preferentially reduced. The configured bandwidth of the PW3 may be reduced by 6 Gbit/s to ensure that the real-time bandwidth of the PW2 is within 2 Gbit/s. The real-time bandwidth of the PW2 is reduced by: 7 Gbit/s−2 Gbit/s=5 Gbit/s. At this time, a maximum sum of the real-time bandwidths of the PW1, PW2, and PW3 is 10 Gbit/s, which is not greater than the bandwidth of the physical interface 1. Therefore, no congestion or packet loss will occur on the network. At this time, the configured bandwidths of the PW1 and PW2 are not adjusted, and the configured bandwidth of the PW3 is adjusted to 2 Gbit/s.

A third manner: The configured bandwidths only of a part of the PWs with a lower bandwidth usage equalization rate may be adjusted.

For the PW2 and PW3, compared with the PW1, the bandwidth usage equalization rates of the PW2 and PW3 are lower, and the configured bandwidths only of the PW2 and PW3 may be adjusted. Further, adjustment may be made according to the bandwidth usage equalization rates of the PW2 and PW3, for example:

The ratio of the bandwidth usage equalization rates of the PW2 and PW3 is 6%:2.9%, and is approximately 2:1. The bandwidths are adjusted according to an inverse ratio of this ratio. Reduced values of the real-time bandwidths of the PW2 and PW3 are determined according to 1:2.

The real-time bandwidth of the PW2 is reduced by 5*1/3=5/3 Gbit/s, which is approximately 2 Gbit/s; and the real-time bandwidth of the PW3 is reduced by 5*2/3=10/3 Gbit/s, which is approximately 3 Gbit/s.

After being reduced, configured bandwidths of the PW2 and PW3 may be calculated according to the reduced values of the real-time bandwidths of the PW2 and PW3:

After being reduced, the configured bandwidth of the PW2 is: 5−2=3 Gbit/s; and after being reduced, the configured bandwidth of the PW3 is: 7−3=4 Gbit/s.

At this time, the configured bandwidth of the PW1 is not adjusted, the configured bandwidth of the PW2 is adjusted to 3 Gbit/s, and the configured bandwidth of the PW3 is adjusted to 4 Gbit/s.

A fourth manner: The configured bandwidth of a PW with a lower bandwidth usage equalization rate may be reduced, and the configured bandwidth of a PW with a higher bandwidth usage equalization rate is increased.

The ratio of the bandwidth usage equalization rates of the PW1, PW2, and PW3 is 16.7%:6%:2.9%. The bandwidth usage equalization rate of the PW1 is higher, and the bandwidth usage equalization rates of the PW2 and PW3 are lower. The configured bandwidths of the PW2 and PW3 may be reduced, and the configured bandwidth of the PW1 may be increased. This can ensure that traffic transmission of the PW1 is timelier, and prevent a problem that excessive accumulation in the packet queue corresponding to the PW1 on the remote module 1 results in queue overflow. However, because the bandwidth usage equalization rates of the PW2 and PW3 are lower, the buffering capability of a packet queue of the remote module 2 may be fully used to reduce occupation of the bandwidth. The ratio of the bandwidth usage equalization rates of the PW2 and PW3 is 6%:2.9%, and is approximately 2:1. The bandwidths are adjusted according to an inverse ratio of this ratio. Reduced values of the real-time bandwidths of the PW2 and PW3 are determined according to 1:2.

The real-time bandwidth of the PW2 is reduced by 5*1/3=5/3 Gbit/s, approximately 2 Gbit/s, and is further reduced by 0.5 Gbit/s on this basis. The reduced value may be adjusted according to an actual situation. Finally, the real-time bandwidth of the PW2 is reduced by 2.5 Gbit/s.

The real-time bandwidth of the PW3 is reduced by 5*2/3=10/3 Gbit/s, approximately 3 Gbit/s, and is further reduced by 1 Gbit/s on this basis. The reduced value may be adjusted according to an actual situation. Finally, the real-time bandwidth of the PW3 is reduced by 4 Gbit/s.

After being reduced, configured bandwidths of the PW2 and PW3 may be calculated according to the reduced values of the real-time bandwidths of the PW2 and PW3:

After being reduced, the configured bandwidth of the PW2 is: 5−2.5=2.5 Gbit/s; and after being reduced, the configured bandwidth of the PW3 is: 7−4=3 Gbit/s.

The configured bandwidth of the PW1 is increased according to the configured bandwidths of the PW2 and PW3 after being reduced.

The configured bandwidth of the PW1 is adjusted to: 3+1.5=4.5 Gbit/s.

Finally, the configured bandwidth of the PW1 is adjusted to 4.5 Gbit/s, the configured bandwidth of the PW2 is adjusted to 2.5 Gbit/s, the configured bandwidth of the PW3 is adjusted to 3 Gbit/s, and a maximum sum of the real-time bandwidths of the PW1, PW2, and PW3 is 10 Gbit/s, which is not greater than the bandwidth of the physical interface 1.

Other bandwidth adjustment manners modified based on the foregoing bandwidth adjustment manners also fall within the protection scope of the present application.

The central module 1 sends the configured bandwidths of the PWs adjusted in any one of the foregoing manners to the corresponding remote modules by using a notification message. After receiving the notification message, the remote modules acquire adjusted configured bandwidth values of the PWs by parsing, and adjust the configured bandwidths of the corresponding PWs. For example, according to the foregoing first manner, the central module 1 sends the adjusted bandwidth 2.5 Gbit/s of the PW1 to the remote module 1 by using a notification message. After receiving the notification message, the remote module 1 adjusts the configured bandwidth of the PW1 to 2.5 Gbit/s. The central module 1 sends the adjusted bandwidth 4 Gbit/s of the PW2 to the remote module 2 by using a notification message. After receiving the notification message, the remote module 2 adjusts the configured bandwidth of the PW2 to 4 Gbit/s. The central module 1 sends the adjusted bandwidth 3.5 Gbit/s of the PW3 to the remote module 2 by using a notification message. After receiving the notification message, the remote module 2 adjusts the configured bandwidth of the PW3 to 3.5 Gbit/s.

As seen above, the central module acquires the real-time bandwidths of the n PWs; and when determining that the sum of the acquired real-time bandwidths of the n PWs is greater than the bandwidth of the physical interface of the central module, adjusts the configured bandwidths of the n PWs. Buffering capabilities of packet queues of remote modules corresponding to PWs with lower bandwidth usage are fully used to avoid, to the greatest extent, network congestion and packet losses that occur on the central module.

Optionally, the adjusting configured bandwidths of the n PWs is adjusting configured bandwidths of PWs that connect S (S<=m) remote modules of the m remote modules to the central module, where S is a positive integer, and the adjusting a configured bandwidth of a PW that connects each remote module of the S remote modules to the central module specifically includes: separately adjusting, according to a manner of adjusting a configured bandwidth of a PW that connects a $T^{th}$ (T<=S) remote module to the central module, the configured bandwidth of the PW that connects each remote module of the S remote modules to the central module, where T is a positive integer, the $T^{th}$ remote module is any remote module of the S remote modules, and the adjusting a configured bandwidth of a PW that connects a $T^{th}$ remote module to the central module includes:

acquiring a ratio of a $T^{th}$ bandwidth value to a first bandwidth value, where the $T^{th}$ bandwidth value is a sum of configured bandwidths of PWs that connect the $T^{th}$ remote module to the central module, and the first bandwidth value is a sum of the configured bandwidths of the n PWs;

acquiring a $W^{th}$ bandwidth value, where the $W^{th}$ bandwidth value is a to-be-reduced real-time bandwidth value for the PWs that connect the $T^{th}$ remote module to the central module, the $W^{th}$ bandwidth value is acquired by multiplying a second bandwidth value by the acquired ratio, and the second bandwidth value is a difference between the sum of real-time bandwidths of each PW of the n PWs and the bandwidth of the physical interface; and adjusting the configured bandwidths of the PWs that connect the $T^{th}$ remote module to the central module, so that real-time bandwidths of the PWs that connect the $T^{th}$ remote module to the central module are reduced by the $W^{th}$ bandwidth value.

Optionally, according to different sums of the acquired configured bandwidths of the PWs that connect each remote module to the central module, the configured bandwidths only of the PWs that connect the S remote modules of the m remote modules to the central module are adjusted.

Optionally, the adjusting the configured bandwidths of the PWs that connect the $T^{th}$ remote module to the central module, so that real-time bandwidths of the PWs that connect the $T^{th}$ remote module to the central module are reduced by the $W^{th}$ bandwidth value, includes:

from the $T^{th}$ remote module, acquiring queue length usage of a packet queue corresponding to each PW that connects the $T^{th}$ remote module to the central module, where the queue length usage is a ratio of a queue length of unsent packets in the packet queue to a total queue length;

acquiring a bandwidth usage equalization rate of each PW that connects the $T^{th}$ remote module to the central module, where the bandwidth usage equalization rate of the PW is acquired by dividing queue length usage of the packet queue corresponding to the PW by the real-time bandwidth of the PW; and adjusting, according to the bandwidth usage equalization rate of each PW that connects the $T^{th}$ remote module to the central module, the configured bandwidth of the PW that connects the $T^{th}$ remote module to the central module, and preferentially adjusting the configured bandwidth of a PW with a lower bandwidth usage equalization rate.

Optionally, the acquiring queue length usage of a packet queue corresponding to each PW that connects the $T^{th}$ remote module to the central module, specifically includes:

acquiring, according to a manner of acquiring queue length usage of a packet queue corresponding to a $Y^{th}$ PW, the queue length usage of the packet queue corresponding to each PW that connects the $T^{th}$ remote module to the central module, where the $Y^{th}$ PW is any PW of all the PWs that connect the $T^{th}$ remote module to the central module, Y is a positive integer, and the acquiring queue length usage of a packet queue corresponding to a $Y^{th}$ PW includes:

sending a $Y^{th}$ queue request message to the $T^{th}$ remote module, where the $Y^{th}$ queue request message includes an ID of the $Y^{th}$ PW; and receiving a $Y^{th}$ queue response message sent by the $T^{th}$ remote module, where the $Y^{th}$ queue response message includes the queue length usage of the packet queue corresponding to the $Y^{th}$ PW, and the $Y^{th}$ queue response message is a response message corresponding to the $Y^{th}$ queue request message.

Optionally, the $Y^{th}$ queue request message may be implemented by using an extended LDP message, and specifically, by using an optional parameters part of the extended LDP message. An extension manner is the same as that of the $R^{th}$ queue request message. The optional parameters part of the extended LDP message may use the message format shown in FIG. 3.

Optionally, the $Y^{th}$ queue response message may be implemented by using an extended LDP message, and specifically, by using an optional parameters part of the extended LDP message. An extension manner is the same as that of the $R^{th}$ queue response message. The optional parameters part of the extended LDP message may use the message format shown in FIG. 5.

Optionally, the queue length usage of packet queues corresponding to all PWs that connect the $T^{th}$ remote module to the central module may be acquired by sending only one queue request message, where the queue request message includes an ID of each PW that connects the $T^{th}$ remote module to the central module. Correspondingly, after receiving the queue request message, the $T^{th}$ remote module responds to the central module with only one queue response message, where the queue response message includes the queue length usage of the packet queue corresponding to each PW that connects the $T^{th}$ remote module to the central module.

To illustrate the foregoing technical solution more clearly, the following continues describing the network virtualization system shown in FIG. 7. As shown in FIG. 7:

The network virtualization system includes the central module 1, the remote module 1, and the remote module 2. The remote module 1 is connected to the central module by the PW1, and the remote module 2 is connected to the central module 1 by the PW2 and PW3. The PW1, PW2, and PW3 are connected to the physical interface 1 of the central module 1. A bandwidth of the physical interface 1 is 10 G, a configured bandwidth of the PW1 is 4 Gbit/s, a configured bandwidth of the PW2 is 6 Gbit/s, and a configured bandwidth of the PW3 is 8 Gbit/s. The central module 1 sends a first bandwidth request message to the remote module 1, and the first bandwidth request message is used to acquire a real-time bandwidth of the PW1. The central module 1 sends a second bandwidth request message to the remote module 2, and the second bandwidth request message is used to acquire real-time bandwidths of the PW2 and PW3. It is assumed that: the real-time bandwidth sent by the remote module 1 to the central module 1 through the PW1 is 3 Gbit/s, the real-time bandwidth sent by the remote module 2 to the central module 1 through the PW2 is 5 Gbit/s, and the real-time bandwidth sent by the remote module 2 to the central module 1 through the PW3 is 7 G. After acquiring the real-time bandwidths of the PW1, PW2, and PW3, the central module 1 determines that a sum of the real-time bandwidths of the PW1, PW2, and PW3 is greater than the bandwidth of the physical interface 1 (an excessive bandwidth value is 5 Gbit/s, and the 5 Gbit/s excessive traffic cannot be normally received by the physical interface 1 and will be discarded), and separately adjusts the bandwidths of the PWs that connect the remote module 1 and remote module 2 to the central module. First, a real-time bandwidth value to be reduced is allocated in an equalization manner according to different configured bandwidths of the PWs that connect the remote modules to the central module. Then, the configured bandwidth of each PW is adjusted according to the to-be-reduced real-time bandwidth value for the PW that connects each remote module to the central module. Using bandwidth adjustment for the PW2 and PW3 that connect the remote module 2 to the central module as an example, the method is as follows:

calculating the $T^{th}$ bandwidth value, where the $T^{th}$ bandwidth value is a sum of the configured bandwidths of the PW2 and PW3, that is, 6+8=14 Gbit/s;

calculating the first bandwidth value, where the first bandwidth value is a sum of the configured bandwidths of the PW1, PW2, and PW3, that is, 4+6+8=18 Gbit/s;

calculating the second bandwidth value, where the second bandwidth value is a difference between the sum of the real-time bandwidths of the PW1, PW2, and PW3 and the bandwidth of the physical interface 1, that is, 3+5+7−10=5 Gbit/s;

calculating a ratio of the $T^{th}$ bandwidth value to the first bandwidth value, that is, 14/18=7/9; and calculating the $W^{th}$ bandwidth value, where the $W^{th}$ bandwidth value is acquired by multiplying the second bandwidth value by a ratio of the $T^{th}$ bandwidth value to the first bandwidth value, that is, 5*7/9=35/9 Gbit/s, and is approximately 4 Gbit/s, which means that the $W^{th}$ bandwidth value is 4 Gbit/s.

The queue request message is sent to the remote module 2 to acquire the queue length usage of the packet queues corresponding to the PW2 and PW3 on the remote module 2. It is assumed that the queue length usage of the packet queue corresponding to the PW2 on the remote module 2 is 30% and the queue length usage of the packet queue corresponding to the PW3 is 20%.

Further, the central module 1 calculates and acquires a bandwidth usage equalization rate of each PW according to the acquired real-time bandwidth of each PW and the queue length usage of each PW:

A bandwidth usage equalization rate of the PW2 is: 30%/5=6%; and a bandwidth usage equalization rate of the PW3 is: 20%/7=2.9%.

The configured bandwidths of the PW2 and PW3 that connect the remote module 2 to the central module are adjusted, so that adjusted real-time bandwidths of the PW2 and PW3 are reduced by the $W^{th}$ bandwidth value.

Specifically, a manner of adjusting the bandwidths of the PW2 and PW3 may be either of the following:

A first manner: The bandwidths are adjusted according to a ratio of the bandwidth usage equalization rates of the PW2 and PW3.

The ratio of the bandwidth usage equalization rates of the PW2 and PW3 is 6%:2.9%, and is approximately 2:1. The bandwidths are adjusted according to an inverse ratio of this ratio. Reduced values of the real-time bandwidths of the PW2 and PW3 are determined according to 1:2.

The reduced value of the real-time bandwidth of the PW2 is 4*1/3=4/3 Gbit/s, and is approximately 1 Gbit/s; and the reduced value of the real-time bandwidth of the PW3 is 4*2/3=8/3 Gbit/s, and is approximately 3 Gbit/s.

After being reduced, configured bandwidths of the PW2 and PW3 may be calculated according to the reduced values of the real-time bandwidths of the PW2 and PW3:

After being reduced, the configured bandwidth of the PW2 is: 5−1=4 Gbit/s; and after being reduced, the configured bandwidth of the PW3 is: 7−3=4 Gbit/s.

A second manner: The configured bandwidth only of a PW with a lowest bandwidth usage equalization rate may be adjusted.

For the PW3, compared with the PW2, the bandwidth usage equalization rate of the PW3 is the lowest. This indicates that the packet queue corresponding to the PW3 on the remote module 2 still has a sufficient buffering capability. The real-time bandwidth of the PW3 may be reduced by 4 Gbit/s. The adjusted configured bandwidth of the PW3 is: 7−4=3 Gbit/s.

Other bandwidth adjustment manners modified based on the foregoing bandwidth adjustment manners also fall within the protection scope of the present application.

The central module 1 sends the configured bandwidth of the PW adjusted in either of the foregoing manners to the corresponding remote module by using a notification message. After receiving the notification message, the remote module acquires an adjusted configured bandwidth value of the PW by parsing, and adjusts the configured bandwidth of the corresponding PW. For example, according to the foregoing first manner, the central module 1 sends the adjusted bandwidth 4 Gbit/s of the PW2 to the remote module 2 by using a notification message. After receiving the notification message, the remote module 2 adjusts the configured bandwidth of the PW2 to 4 Gbit/s. The central module 1 sends the adjusted bandwidth 4 Gbit/s of the PW3 to the remote module 2 by using a notification message. After receiving the notification message, the remote module 2 adjusts the configured bandwidth of the PW3 to 4 Gbit/s.

As seen above, the central module acquires the real-time bandwidths of the n PWs; and when determining that the sum of the acquired real-time bandwidths of the n PWs is greater than the bandwidth of the physical interface of the central module, adjusts the configured bandwidth of the PW of each remote module in an equalization manner according to different configured bandwidths of the PWs that connect each remote modules to the central module. Buffering capabilities of different remote modules are fully used to avoid, to the greatest extent, network congestion and packet loss that occur on the central module.

Figure 8:
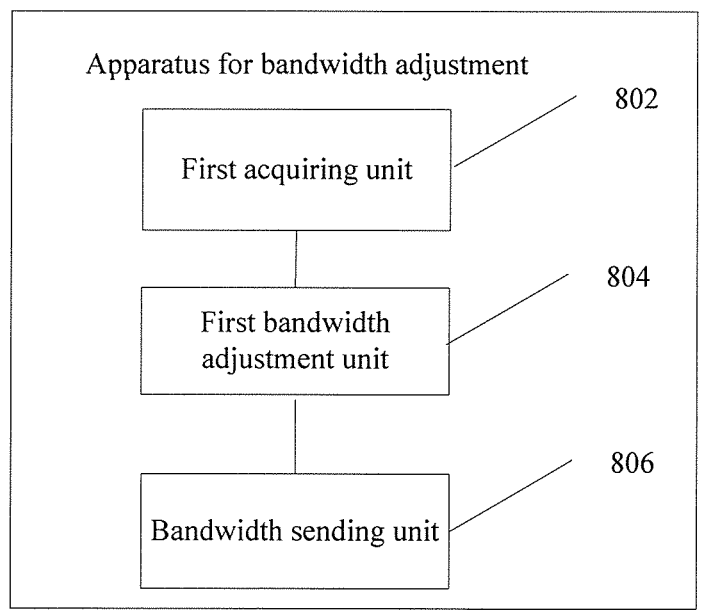
FIG. 8 is a schematic diagram of an apparatus for bandwidth adjustment in a network virtualization system according to an embodiment of the present application.

Referring to FIG. 8, an embodiment of the present application provides an apparatus for bandwidth adjustment in a network virtualization system, including the following content.

The network virtualization system includes the apparatus for bandwidth adjustment and m remote modules, where the m remote modules are connected to a physical interface of the apparatus for bandwidth adjustment by n PWs, traffic is transmitted through the n PWs, and m and n are positive integers. The apparatus for bandwidth adjustment includes:

a first acquiring unit 802, configured to acquire, from the m remote modules, a real-time bandwidth of each PW of the n PWs, where the real-time bandwidth is a value of a bandwidth occupied by real-time traffic transmitted through each PW from a remote module to the apparatus for bandwidth adjustment;

a first bandwidth adjustment unit 804, configured to adjust configured bandwidths of P (P<=n) PWs when a sum of the acquired real-time bandwidths of the n PWs is greater than a bandwidth of the physical interface, so that the sum of the real-time bandwidths of the n PWs is not greater than the bandwidth of the physical interface, where P is a positive integer, and the P PWs are PWs of the n PWs; and a bandwidth sending unit 806, configured to separately send values of adjusted configured bandwidths of the P PWs to the remote modules separately connected to the P PWs.

Optionally, the first acquiring unit 802 includes a first requesting subunit and a first receiving subunit:

the first requesting subunit is configured to send a bandwidth request message to the m remote modules, requesting to acquire the real-time bandwidth of each PW of the n PWs; and the first receiving subunit is configured to receive a bandwidth response message sent by the m remote modules, and acquire, from the bandwidth response message, the real-time bandwidth of each PW of the n PWs.

Specifically, the acquiring, by the first acquiring unit 802, from the m remote modules, the real-time bandwidth of each PW of the n PWs, specifically includes: separately acquiring the real-time bandwidth of each PW of the n PWs according to a manner of acquiring a real-time bandwidth of a $Q^{th}$ ($Q<=n$) PW, where Q is a positive integer, the $Q^{th}$ PW is any one of the n PWs, and the acquiring a real-time bandwidth of a $Q^{th}$ PW includes:

sending, by the first requesting subunit, a $Q^{th}$ bandwidth request message to a remote module corresponding to the $Q^{th}$ PW, where the $Q^{th}$ bandwidth request message includes an identifier ID of the $Q^{th}$ PW; and receiving, by the first receiving subunit, a $Q^{th}$ bandwidth response message, where the $Q^{th}$ bandwidth response message includes the real-time bandwidth of the $Q^{th}$ PW and the $Q^{th}$ bandwidth response message is a response message corresponding to the $Q^{th}$ bandwidth request message.

The remote module corresponding to the $Q^{th}$ PW is a remote module connected to the apparatus for bandwidth adjustment by the $Q^{th}$ PW. The $Q^{th}$ bandwidth request message may be implemented by using an LDP message, and specifically, by using an optional parameters (Optional parameters) part of an extended LDP message. The optional parameters part of the LDP message may use the message format shown in FIG. 3. For meanings of fields, reference may be made to the related part in the foregoing embodiment.

After the remote module corresponding to the $Q^{th}$ PW receives the $Q^{th}$ bandwidth request message, acquires a message type of the $Q^{th}$ bandwidth request message by parsing, and determines that the message type is a specific value, for example, the specific value is 101, the remote module collects statistics on the real-time bandwidth of the $Q^{th}$ PW and sends a $Q^{th}$ bandwidth response message to the apparatus for bandwidth adjustment, where the $Q^{th}$ bandwidth response message includes the real-time bandwidth of the $Q^{th}$ PW acquired by statistics collection. After receiving the $Q^{th}$ bandwidth response message, the apparatus for bandwidth adjustment acquires the real-time bandwidth of the $Q^{th}$ PW by parsing. The $Q^{th}$ bandwidth response message may be implemented by using an extended LDP message, and specifically, by using an optional parameters part of the extended LDP message. The optional parameters part of the extended LDP message may use the message format shown in FIG. 4. For meanings of fields, reference may be made to the related part in the foregoing embodiment.

After receiving the $Q^{th}$ bandwidth response message, the first receiving subunit of the apparatus for bandwidth adjustment acquires a message type of the $Q^{th}$ bandwidth response message by parsing; and when it is determined that the message type is a specific value, for example, the specific value is 102, acquires the real-time bandwidth of the $Q^{th}$ PW by parsing.

Optionally, the first bandwidth adjustment unit further includes a first acquiring subunit, a second acquiring subunit, and a first bandwidth adjustment subunit:

the first acquiring subunit is configured to acquire, from the m remote modules, queue length usage of a packet queue corresponding to each PW of the n PWs, where the queue length usage is a ratio of a queue length of unsent packets in the packet queue to a total queue length;

the second acquiring subunit is configured to acquire a bandwidth usage equalization rate of each PW, where the bandwidth usage equalization rate of the PW is acquired by dividing queue length usage of the packet queue corresponding to the PW by the real-time bandwidth of the PW; and the first bandwidth adjustment subunit is configured to adjust the configured bandwidths of the P PWs according to the bandwidth usage equalization rate of each PW of the n PWs, so that the sum of the real-time bandwidths of the n PWs is not greater than the bandwidth of the physical interface.

Optionally, the first acquiring subunit includes a second requesting subunit and a second receiving subunit:

the second requesting subunit is configured to send a queue request message to the n PWs, requesting to acquire the queue length usage of the packet queue corresponding to each PW of the n PWs; and the second receiving subunit is configured to receive a queue response message sent by remote modules corresponding to the n PWs, and acquire, from the queue response message, the queue length usage of the packet queue corresponding to each PW.

Specifically, the acquiring, by the first acquiring subunit, queue length usage of a packet queue corresponding to each PW of the n PWs, specifically includes: separately acquiring the queue length usage of the packet queue corresponding to each PW of the n PWs according to a manner of acquiring queue length usage of a packet queue corresponding to an $R^{th}$ PW, where the $R^{th}$ PW is any PW of the n PWs, and the acquiring queue length usage of a packet queue corresponding to an $R^{th}$ PW includes:

sending, by the second requesting subunit, an $R^{th}$ queue request message to a remote module corresponding to the $R^{th}$ PW, where the $R^{th}$ queue request message includes an ID of the $R^{th}$ PW; and receiving, by the second receiving subunit, an $R^{th}$ queue response message sent by the remote module corresponding to the $R^{th}$PW, where the $R^{th}$ queue response message includes the queue length usage of the packet queue corresponding to the $R^{th}$ PW, and the $R^{th}$ queue response message is a response message corresponding to the $R^{th}$ queue request message.

Optionally, the $R^{th}$ queue request message may be implemented by using an extended LDP message, and specifically, by using an optional parameters part of the extended LDP message. The optional parameters part of the extended LDP message may use the message format shown in FIG. 3. For meanings of fields, reference may be made to the related part in the foregoing embodiment.

The packet queue corresponding to the $R^{th}$ PW is a packet queue, of sent packet queues saved by the remote module corresponding to the $R^{th}$ PW, sent to the apparatus for bandwidth adjustment through the $R^{th}$ PW. After the remote module corresponding to the $R^{th}$ PW receives the $R^{th}$ queue request message, acquires a message type of the $R^{th}$ queue request message by parsing, and determines that the message type is a specific value, for example, the specific value is 104, the remote module collects statistics on the queue length usage of the packet queue corresponding to the $R^{th}$ PW and sends an $R^{th}$ queue response message to the apparatus for bandwidth adjustment, where the $R^{th}$ queue response message includes the queue length usage corresponding to the $R^{th}$ PW, which is acquired by statistics collection. After receiving the $R^{th}$ queue response message, the second receiving subunit of the apparatus for bandwidth adjustment acquires the queue length usage of the packet queue corresponding to the $R^{th}$ PW by parsing.

The acquired bandwidth usage equalization rate of each PW is used to indicate a bandwidth usage condition of each PW, where the bandwidth usage equalization rate of the PW is acquired by dividing queue length usage of the packet queue corresponding to the PW by the real-time bandwidth of the PW. When queue length usage of a packet queue corresponding to a PW is lower and a real-time bandwidth of the PW is larger, a bandwidth usage equalization rate of the PW is lower.

Optionally, the sending, by the bandwidth sending unit 806, the adjusted configured bandwidths of the PWs, whose configured bandwidths are adjusted, of the n PWs to the corresponding remote ends may be implemented by sending a notification message to the remote modules corresponding to the PWs whose configured bandwidths are adjusted, where the notification message may be implemented by using an extended LDP message, and specifically, by using an optional parameters part of the extended LDP message. The optional parameters part of the extended LDP message may use the message format shown in FIG. 6. For meanings of fields, reference may be made to the related part in the foregoing embodiment.

As seen above, the apparatus for bandwidth adjustment acquires the real-time bandwidths of the n PWs; and when determining that the sum of the acquired real-time bandwidths of the n PWs is greater than the bandwidth of the physical interface of the central module, adjusts the configured bandwidths of the n PWs. Buffering capabilities of packet queues of remote modules corresponding to PWs with lower bandwidth usage are fully used to avoid, to the greatest extent, network congestion and packet losses that occur on the apparatus for bandwidth adjustment.

Optionally, the adjusting, by the first bandwidth adjustment unit 804, configured bandwidths of the n PWs is adjusting configured bandwidths of PWs that connect S (S<=m) remote modules of the m remote modules to the apparatus for bandwidth adjustment, where S is a positive integer, and the first bandwidth adjustment unit includes a third acquiring subunit and a third bandwidth adjustment subunit:

the third acquiring subunit is configured to acquire a to-be-reduced real-time bandwidth value of a PW that connects each remote module of the S remote modules to the apparatus for bandwidth adjustment; and the third adjustment subunit is configured to adjust a configured bandwidth of the PW that connects each remote module of the S remote modules to the apparatus for bandwidth adjustment, so that a real-time bandwidth of the PW that connects each remote module of the S remote modules to the apparatus for bandwidth adjustment is reduced by the real-time bandwidth value.

Specifically, the adjusting, by the first bandwidth adjustment unit 804, the configured bandwidth of the PW that connects each remote module of the S remote modules to the apparatus for bandwidth adjustment, specifically includes: separately adjusting, according to a manner of adjusting a configured bandwidth of a PW that connects a $T^{th}$ (T<=S) remote module to the apparatus for bandwidth adjustment, the configured bandwidth of the PW that connects each remote module of the S remote modules to the apparatus for bandwidth adjustment, where T is a positive integer, the $T^{th}$ remote module is any remote module of the S remote modules, and the adjusting a configured bandwidth of a PW that connects a $T^{th}$ remote module to the apparatus for bandwidth adjustment includes:

acquiring, by the third acquiring subunit, a ratio of a $T^{th}$ bandwidth value to a first bandwidth value, where the $T^{th}$ bandwidth value is a sum of configured bandwidths of PWs that connect the $T^{th}$ remote module to the apparatus for bandwidth adjustment, and the first bandwidth value is a sum of the configured bandwidths of the n PWs; and acquiring a $W^{th}$ bandwidth value, where the $W^{th}$ bandwidth value is acquired by multiplying a second bandwidth value by the acquired ratio, and the second bandwidth value is a difference between the sum of the real-time bandwidths of each PW of the n PWs and the bandwidth of the physical interface; and adjusting, by the third bandwidth adjustment subunit, the configured bandwidths of the PWs that connect the $T^{th}$ remote module to the apparatus for bandwidth adjustment, so that real-time bandwidths of the PWs that connect the $T^{th}$ remote module to the apparatus for bandwidth adjustment are reduced by the $W^{th}$ bandwidth value.

Optionally, the third bandwidth adjustment subunit further includes a fourth acquiring subunit, a fifth acquiring subunit, and a fourth bandwidth adjustment subunit:

the fourth acquiring subunit is configured to acquire, from the $T^{th}$ remote module, queue length usage of a packet queue corresponding to each PW that connects the $T^{th}$ remote module to the apparatus for bandwidth adjustment, where the queue length usage is a ratio of a queue length of unsent packets in the packet queue to a total queue length;

the fifth acquiring subunit is configured to acquire a bandwidth usage equalization rate of each PW that connects the $T^{th}$ remote module to the apparatus for bandwidth adjustment, where the bandwidth usage equalization rate of the PW is acquired by dividing queue length usage of the packet queue corresponding to the PW by the real-time bandwidth of the PW; and the fourth bandwidth adjustment subunit is configured to adjust, according to the bandwidth usage equalization rate of each PW that connects the $T^{th}$ remote module to the apparatus for bandwidth adjustment, the configured bandwidths of the PWs that connect the $T^{th}$ remote module to the apparatus for bandwidth adjustment, and preferentially adjust a configured bandwidth of a PW with a lower bandwidth usage equalization rate.

Optionally, the fourth acquiring subunit includes a third requesting subunit and a third receiving subunit:

the third requesting subunit is configured to send a queue request message to the $T^{th}$ remote module, requesting to acquire the queue length usage of the packet queue corresponding to each PW that connects the $T^{th}$ remote module to the apparatus for bandwidth adjustment; and the third receiving subunit is configured to receive a queue response message sent by the $T^{th}$ remote module, and acquire, from the queue response message, the queue length usage of the packet queue corresponding to each PW that connects the $T^{th}$ remote module to the apparatus for bandwidth adjustment.

Specifically, the acquiring, by the fourth acquiring subunit, queue length usage of a packet queue corresponding to each PW that connects the $T^{th}$ remote module to the apparatus for bandwidth adjustment, specifically is: acquiring, according to a manner of acquiring queue length usage of a packet queue corresponding to a $Y^{th}$ PW, the queue length usage of the packet queue corresponding to each PW that connects the $T^{th}$ remote module to the apparatus for bandwidth adjustment, where Y is a positive integer, the $Y^{th}$ PW is any PW of all the PWs that connect the $T^{th}$ remote module to the apparatus for bandwidth adjustment, and the acquiring queue length usage of a packet queue corresponding to a $Y^{th}$ PW includes:

sending, by the third requesting subunit, a $Y^{th}$ queue request message to the $T^{th}$ remote module, where the $Y^{th}$ queue request message includes an ID of the $Y^{th}$ PW; and receiving, by the third receiving subunit, a $Y^{th}$ queue response message sent by the $T^{th}$ remote module, where the $Y^{th}$ queue response message includes the queue length usage of the packet queue corresponding to the $Y^{th}$ PW, and the $Y^{th}$ queue response message is a response message corresponding to the $Y^{th}$ queue request message.

Optionally, the $Y^{th}$ queue request message may be implemented by using an extended LDP message, and specifically, by using an optional parameters part of the extended LDP message. An extension manner is the same as that of the $R^{th}$ queue request message. The optional parameters part of the extended LDP message may use the message format shown in FIG. 3.

Optionally, the $Y^{th}$ queue response message may be implemented by using an extended LDP message, and specifically, by using an optional parameters part of the extended LDP message. An extension manner is the same as that of the $R^{th}$ queue response message. The optional parameters part of the extended LDP message may use the message format shown in FIG. 5.

Optionally, the apparatus for bandwidth adjustment may be implemented by a router or a switch, and may also be implemented by a BRAS or an SR.

As seen above, the apparatus for bandwidth adjustment acquires the real-time bandwidths of the n PWs; and when determining that the sum of the acquired real-time bandwidths of the n PWs is greater than the bandwidth of the physical interface of the apparatus for bandwidth adjustment, adjusts the configured bandwidth of the PW of each remote module in an equalization manner according to different configured bandwidths of the PWs that connect each remote module to the apparatus for bandwidth adjustment. Buffering capabilities of different remote modules are fully used to avoid, to the greatest extent, network congestion and packet losses that occur on the apparatus for bandwidth adjustment.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present application other than limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present application.

What is claimed is:

1. A method for bandwidth adjustment in a network virtualization system comprising a central module and m remote modules, the m remote modules are connected to a physical interface of the central module by n pseudo wires (PWs), traffic is transmitted over the n PWs, and m and n are positive integers, the method comprising:

acquiring, from the m remote modules, a real-time bandwidth of each PW of the n PWs, wherein the real-time bandwidth is a value of a bandwidth occupied by real-time traffic transmitted through each PW from a remote module to the central module;

when a sum of the acquired real-time bandwidths of the n PWs is greater than a bandwidth of the physical interface, adjusting configured bandwidths of P (P<=n) PWs, so that the sum of the real-time bandwidths of the n PWs is not greater than the bandwidth of the physical interface, wherein P is a positive integer, and the P PWs are PWs of the n PWs; and separately sending values of adjusted configured bandwidths of the P PWs to the remote modules separately connected to the P PWs;

wherein adjusting configured bandwidths of the P PWs, comprises:

acquiring queue length usage of a packet queue corresponding to each PW of the n PWs from the m remote modules, wherein the queue length usage is a ratio of a queue length of unsent packets in the packet queue to a total queue length;

acquiring a bandwidth usage equalization rate of each PW, wherein the bandwidth usage equalization rate of the PW is acquired by dividing queue length usage of the packet queue corresponding to the PW by the real-time bandwidth of the PW; and adjusting the configured bandwidths of the P PWs according to the bandwidth usage equalization rate of each PW of the n PWs, so that the sum of the real-time bandwidths of the n PWs is not greater than the bandwidth of the physical interface.

2. The method according to claim 1, wherein acquiring, from the m remote modules, a real-time bandwidth of each PW of the n PWs, comprises:

separately acquiring a real-time bandwidth of each PW of the n PWs according to a manner of acquiring a real-time bandwidth of a Qth (Q<=n) PW, wherein Q is a positive integer, the Qth PW is any one of the n PWs, and acquiring a real-time bandwidth of a Qth PW comprises:

sending a Qth bandwidth request message to a remote module corresponding to the Qth PW, wherein the Qth bandwidth request message comprises an identifier (ID) of the Qth PW; and receiving a Qth bandwidth response message, wherein the Qth bandwidth response message comprises the real-time bandwidth of the Qth PW, and the Qth bandwidth response message is a response message corresponding to the Qth bandwidth request message.

3. The method according to claim 1, wherein acquiring queue length usage of a packet queue corresponding to each PW of the n PWs comprises:
separately acquiring the queue length usage of the packet queue corresponding to each PW of the n PWs according to a manner of acquiring queue length usage of a packet queue corresponding to an Rth (R<=n) PW, wherein R is a positive integer, the Rth PW is any PW of the n PWs, and acquiring queue length usage of a packet queue corresponding to an Rth PW comprises:
sending an Rth queue request message to a remote module corresponding to the Rth PW, wherein the Rth queue request message comprises an ID of the Rth PW; and
receiving an Rth queue response message sent by the remote module corresponding to the Rth PW, wherein the Rth queue response message comprises the queue length usage of the packet queue corresponding to the Rth PW, and the Rth queue response message is a response message corresponding to the Rth queue request message.

4. The method according to claim 1, wherein:
adjusting configured bandwidths of P (P<=n) PWs comprises adjusting configured bandwidths of PWs that connect S (S<=m) remote modules of the m remote modules to the central module, S is a positive integer;
adjusting a configured bandwidth of a PW that connects the S remote modules of the m remote modules to the central module comprises:
separately adjusting, according to a manner of adjusting a configured bandwidth of a PW that connects a Tth (T<=S) remote module to the central module, the configured bandwidth of the PW that connects each remote module of the S remote modules to the central module, wherein T is a positive integer, the Tth remote module is any remote module of the S remote modules; and
adjusting a configured bandwidth of a PW that connects the Tth remote module to the central module comprises:
acquiring a ratio of a Tth bandwidth value to a first bandwidth value, wherein the Tth bandwidth value is a sum of configured bandwidths of PWs that connect the Tth remote module to the central module, and the first bandwidth value is a sum of the configured bandwidths of the n PWs,
acquiring a Wth bandwidth value, wherein the Wth bandwidth value is a to-be-reduced real-time bandwidth value for the PWs that connect the Tth remote module to the central module, the Wth bandwidth value is acquired by multiplying a second bandwidth value by the acquired ratio, and the second bandwidth value is a difference between the sum of the real-time bandwidths of the n PWs and the bandwidth of the physical interface, and
adjusting the configured bandwidths of the PWs that connect the Tth remote module to the central module, so that real-time bandwidths of the PWs that connect the Tth remote module to the central module are reduced by the Wth bandwidth value.

5. The method according to claim 4, wherein adjusting the configured bandwidths of the PWs that connect the Tth remote module to the central module, so that real-time bandwidths of the PWs that connect the Tth remote module to the central module are reduced by the Wth bandwidth value, comprises:
from the Tth remote module, acquiring queue length usage of a packet queue corresponding to each PW that connects the Tth remote module to the central module, wherein the queue length usage is a ratio of a queue length of unsent packets in the packet queue to a total queue length;
acquiring a bandwidth usage equalization rate of each PW that connects the Tth remote module to the central module, wherein the bandwidth usage equalization rate of the PW is acquired by dividing queue length usage of the packet queue corresponding to the PW by the real-time bandwidth of the PW; and
adjusting, according to the bandwidth usage equalization rate of each PW that connects the Tth remote module to the central module, the configured bandwidth of the PW that connects the Tth remote module to the central module.

6. The method according to claim 5, wherein acquiring queue length usage of a packet queue corresponding to each PW that connects the Tth remote module to the central module comprises:
acquiring, according to a manner of acquiring queue length usage of a packet queue corresponding to a Yth PW, the queue length usage of the packet queue corresponding to each PW that connects the Tth remote module to the central module, wherein the Yth PW is any PW of all the PWs that connect the Tth remote module to the central module, Y is a positive integer; and
acquiring queue length usage of a packet queue corresponding to a Yth PW comprises:
sending a Yth queue request message to the Tth remote module, wherein the Yth queue request message comprises an ID of the Yth PW, and
receiving a Yth queue response message sent by the Tth remote module, wherein the Yth queue response message comprises the queue length usage of the packet queue corresponding to the Yth PW, and the Yth queue response message is a response message corresponding to the Yth queue request message.

7. A non-transitory computer-readable storage medium including computer executable instructions that when implemented by a processor in a network virtualization system cause the processor to perform a method comprising:
acquiring, from m remote modules, a real-time bandwidth of each PW of the n PWs, wherein the real-time bandwidth is a value of a bandwidth occupied by real-time traffic transmitted through each PW from a remote module to an apparatus for bandwidth adjustment, wherein the network virtualization system comprises the apparatus for bandwidth adjustment and the m remote modules, the m remote modules are connected to a physical interface of the apparatus for bandwidth adjustment by n PWs, traffic is transmitted over the n PWs, and m and n are positive integers;
adjusting configured bandwidths of P (P<=n) PWs when a sum of the acquired real-time bandwidths of the n PWs is greater than a bandwidth of the physical interface, so that the sum of the real-time bandwidths of the n PWs is not greater than the bandwidth of the physical interface, wherein P is a positive integer, and the P PWs are PWs of the n PWs; and
separately sending values of adjusted configured bandwidths of the P PWs to the remote modules separately connected to the P PWs;
acquiring, from the m remote modules, queue length usage of a packet queue corresponding to each PW of the n PWs, wherein the queue length usage is a ratio of a queue length of unsent packets in the packet queue to a total queue length;

acquiring a bandwidth usage equalization rate of each PW, wherein the bandwidth usage equalization rate of the PW is acquired by dividing queue length usage of the packet queue corresponding to the PW by the real-time bandwidth of the PW; and adjusting the configured bandwidths of the P PWs according to the bandwidth usage equalization rate of each PW of the n PWs, so that the sum of the real-time bandwidths of the n PWs is not greater than the bandwidth of the physical interface.

8. The non-transitory computer-readable storage medium according to claim 7, wherein the method further comprises:

sending a bandwidth request message to the m remote modules, requesting to acquire the real-time bandwidth of each PW of the n PWs, and receiving a bandwidth response message sent by the m remote modules, and acquire, from the bandwidth response message, the real-time bandwidth of each PW of the n PWs; and separately acquiring the real-time bandwidth of each PW of the n PWs according to a manner of acquiring a real-time bandwidth of a Qth (Q<=n) PW, wherein Q is a positive integer, the Qth PW is any one of the n PWs, and sending a Qth bandwidth request message to a remote module corresponding to the Qth PW, wherein the Qth bandwidth request message comprises an identifier ID of the Qth PW, and receiving a Qth bandwidth response message, wherein the Qth bandwidth response message comprises the real-time bandwidth of the Qth PW, and the Qth bandwidth response message is a response message corresponding to the Qth bandwidth request message.

9. The non-transitory computer-readable storage medium according to claim 7, wherein the method further comprises:

sending a queue request message to the n PWs, requesting to acquire the queue length usage of the packet queue corresponding to each PW of the n PWs, and receiving a queue response message sent by the remote modules corresponding to the n PWs, and acquire, from the queue response message, the queue length usage of the packet queue corresponding to each PW; and separately acquiring the queue length usage of the packet queue corresponding to each PW of the n PWs according to a manner of acquiring queue length usage of a packet queue corresponding to an Rth PW, wherein the Rth PW is any PW of the n PWs, sending an Rth queue request message to a remote module corresponding to the Rth PW, wherein the Rth queue request message comprises an ID of the Rth PW, and receiving an Rth queue response message sent by the remote module corresponding to the Rth PW, wherein the Rth queue response message comprises the queue length usage of the packet queue corresponding to the Rth PW, and the Rth queue response message is a response message corresponding to the Rth queue request message.

10. The non-transitory computer-readable storage medium according to claim 7, wherein the method further comprises:

adjusting configured bandwidths of PWs that connect S (S<=m) remote modules of the m remote modules to the central module, S is a positive integer;

acquiring a to-be-reduced real-time bandwidth value for a PW that connects each remote module of the S remote modules to the central module, and adjusting a configured bandwidth of the PW that connects each remote module of the S remote modules to the central module, so that a real-time bandwidth of the PW that connects each remote module of the S remote modules to the central module is reduced by the real-time bandwidth value; and separately adjusting, according to a manner of adjusting a configured bandwidth of a PW that connects a Tth (T<=S) remote module to the central module, the configured bandwidth of the PW that connects each remote module of the S remote modules to the central module, wherein T is a positive integer, the Tth remote module is any remote module of the S remote modules, acquiring, a ratio of a Tth bandwidth value to a first bandwidth value, wherein the Tth bandwidth value is a sum of configured bandwidths of PWs that connect the Tth remote module to the central module, and the first bandwidth value is a sum of the configured bandwidths of the n PWs, acquiring a Wth bandwidth value, wherein the Wth bandwidth value is acquired by multiplying a second bandwidth value by the acquired ratio, and the second bandwidth value is a difference between the sum of the real-time bandwidths of each PW of the n PWs and the bandwidth of the physical interface, and adjusting the configured bandwidths of the PWs that connect the Tth remote module to the central module, so that real-time bandwidths of the PWs that connect the Tth remote module to the central module are reduced by the Wth bandwidth value.

11. The non-transitory computer-readable storage medium according to claim 10, wherein the method further comprises:

acquiring, from the Tth remote module, queue length usage of a packet queue corresponding to each PW that connects the Tth remote module to the central module, wherein the queue length usage is a ratio of a queue length of unsent packets in the packet queue to a total queue length;

acquiring a bandwidth usage equalization rate of each PW that connects the Tth remote module to the central module, wherein the bandwidth usage equalization rate of the PW is acquired by dividing queue length usage of the packet queue corresponding to the PW by the real-time bandwidth of the PW; and adjusting, according to the bandwidth usage equalization rate of each PW that connects the Tth remote module to the central module, the configured bandwidth of the PW that connects the Tth remote module to the central module.

12. The non-transitory computer-readable storage medium according to claim 11, wherein the method further comprises:

sending a queue request message to the Tth remote module, requesting to acquire the queue length usage of the packet queue corresponding to each PW that connects the Tth remote module to the central module; and receiving a queue response message sent by the Tth remote module, and acquire, from the queue response message, the queue length usage of the packet queue corresponding to each PW that connects the Tth remote module to the central module; and acquiring, according to a manner of acquiring queue length usage of a packet queue corresponding to a Yth PW, the queue length usage of the packet queue corresponding to each PW that connects the Tth remote module to the central module, wherein Y is a positive integer, the Yth PW is any PW of all the PWs that connect the Tth remote module to the central module, sending a Yth queue request message to the Tth remote module, wherein the Yth queue request message comprises an ID of the Yth PW, and receiving, a Yth queue response message sent by the Tth remote module, wherein the Yth queue response message comprises the queue length usage of the packet queue corresponding to the Yth PW, and the Yth queue response message is a response message corresponding to the Yth queue request message.

\* \* \* \* \*